3,016,332
METHOD OF PREPARING ANTI-P SERUM AND ANTI-Le[a] SERUM
Philip Levine, Plainfield, N.J., assignor to Ortho Pharmaceutical Corporation, a corporation of New Jersey
No Drawing. Filed Aug. 21, 1959, Ser. No. 835,188
7 Claims. (Cl. 167—78)

This application is a continuation-in-part of my pending application, Serial No. 733,820, filed May 8, 1958, now abandoned.

The present invention relates to the production of antibodies and, more particularly, to the production of highly specific agglutinins useful in the identification of human blood groups.

Attempts to produce agglutinins corresponding to the agglutinogens present in human blood by injecting a non-human animal species with human erythrocytes have, with few exceptions, been unsuccessful. Human blood group antigens in general are not antigenic when injected into animals of other species. When immunization does occur and the animal develops a high titer to the human blood group antigen, the agglutinin is frequently non-specific.

It is an object of this invention, therefore, to produce in non-human animal species a serum containing a specific agglutinin of high titer.

It has now been discovered that if rabbit red blood cells or human red blood cells are first tanned by the method of Boyden as described in the Journal of Experimental Medicine, volume 93, pages 107–120 (1951), and then treated with a solution of a soluble human blood group antigen, the treated red cells take up or absorb a small amount of the antigen. This may be demonstrated by the ability of the tanned and coated red cells to absorb completely from a human serum the agglutinins corresponding to the antigen on the coated cell. If these tanned and coated cells are injected into rabbits, these rabbits produce the corresponding agglutinins in their sera. While I do not wish to be limited to any specific theory, the unexpected antigenicity of the tanned and coated red cells may be due to a slow release of the antigen from the surface of the tanned and sensitized red cell. The sera from such rabbits are absorbed to remove unwanted non-specific agglutinins. The absorbed sera show potent and specific agglutinin activity.

The blood group system P was one of the early known blood group systems, discovered by Lansteiner and Levine in 1927 during the experimental immunization of rabbits with human red cells. The serum of one rabbit, after absorption with certain red cells, contained an antibody that did not belong to either of the blood group systems known at that time. The human blood cells that reacted with this antibody were designated P-positive and those that did not react with it, P-negative. The antibody was named anti-P. While anti-P occurs naturally in the serum of some animals, such as the rabbit, and is occasionally present in the serum of P-negative humans, it is very rare to find a potent anti-P serum of high titer. Such a serum may be produced by the process of the present invention.

Serum prepared according to the present invention, may be used to identify the Lewis blood group system. While the anti-Le[a] antibody is naturally occurring, serum of high titer is very rare and, therefore, a method of producing this antibody in a non-human animal assumes importance.

For a fuller understanding of the invention, reference should be made to the following examples which are given as specific illustrations. It should be understood, however, that the invention is not limited to the specific details set forth in the examples.

EXAMPLE I

Human P-negative cells are tanned by the method of Boyden referred to above and are then agitated slowly with a solution of lyophilized hydatid cyst fluid. The cyst fluid was derived from active hydatid cyst scolices in the livers of sheep and contained 3.44 milligrams of nitrogen per cubic centimeter. The tanned cells, after contacting the hydatid cyst fluid for approximately ten minutes, were removed by centrifugation and washed in 0.15 molar saline. The presence of P substance on the surface of these cells is demonstrated by their ability to absorb completely an anti-P human serum, the titer of which is 1:16.

Six rabbits are injected with 1.0 cubic centimeter of a 5% suspension of washed P-negative red cells, tanned and coated with cyst fluid as described above. The first injection is made intraveneously, followed by three subcutaneous injections in multiple sites at intervals of one week. When tested after four injections, the rabbit sera absorbed with human P-negative cells showed distinct anti-P activity. This effect intensifies after an additional three injections (two intraveneously and one in multiple sites) of the tanned P-negative cell coated with the cyst fluid. These latter three injections were also made at one week intervals, following a one-month rest period. As shown in Table I, only one of the six rabbits (No. 2) had a normal anti-P which failed to increase in activity when tested after four injections, but there was a distinctly increased anti-P activity in this rabbit after the second series of injections. These findings are summarized in Table I.

Table I

| | Test Cells | | | | | |
|---|---|---|---|---|---|---|
| | P+ | | | P− | | |
| | M | MN | N | M | MN | N |
| Pre-inoculation: | | | | | | |
| Rabbit 1 | 0 | 0 | 0 | 0 | 0 | 0 |
| Rabbit 2 | ± | ++ | ++ | 0 | 0 | 0 |
| Rabbit 3 | 0 | 0 | 0 | 0 | 0 | 0 |
| Rabbit 4 | 0 | 0 | 0 | 0 | 0 | 0 |
| Rabbit 5 | 0 | 0 | 0 | 0 | 0 | 0 |
| Rabbit 6 | 0 | 0 | 0 | 0 | 0 | 0 |
| Post-Inoculation: | | | | | | |
| Rabbit 1 | ++ | +++ | +++ | 0 | 0 | 0 |
| Rabbit 2 | ++++ | +++ | +++ | 0 | 0 | 0 |
| Rabbit 3 | +++ | +++ | +++ | 0 | 0 | 0 |
| Rabbit 4 | +++ | +++ | +++ | 0 | 0 | 0 |
| Rabbit 5 | +++ | +++ | +++ | 0 | 0 | 0 |
| Rabbit 6 | ++++ | ++++ | ++++ | 0 | 0 | 0 |

The sera collected from each of the six rabbits is diluted one to ten and absorbed with one-half volume of washed, packed human P-negative red cells.

These sera are tested for anti-P activity by mixing in six tubes two drops of each absorbed serum and two drops of a 2% suspension of three P-positive and three P-negative washed red cells suspension. After the six tubes have stood for one hour at room temperature followed by light centrifugation and resuspension, the tests are read. P-positive red cells are agglutinated but not the P-negative red cells.

EXAMPLE II

Rabbit red blood cells are washed with 0.15 molar saline and the washed cells are tanned by the method of Boyden referred to above and are then agitated slowly with human hydatid cyst fluid. The treated cells are separated by centrifugation and washed again with 0.15 molar saline solution. The presence of P substance on the surface of these cells is demonstrated by their ability to absorb completely an anti-P human serum, the titer of which is 1:16. Rabbits are injected with 1 cubic centimeter of a 5% suspension of the tanned red cells coated with human cyst fluid, as described in Example I above. The sera from individual rabbits are diluted 1:10 and absorbed with one-half volume of human P-negative red cells. These cells are separated by centrifugation and the supernatant is tested against P-positive and P-negative human red cells as described in Example I above. The presence of anti-P is indicated by positive reactions with P-positive red cells and negative reactions with P-negative red cells. Any serum that fails to react with P-positive human red cells is discarded. The sera that pass this test may be pooled and used as a reagent to detect the P factor.

EXAMPLE III

Human P-negative red blood cells are washed with 0.15 molar saline and the washed cells are tanned by the method of Boyden referred to above and are then agitated slowly with human hydatid cyst fluid. The treated cells are separated by centrifugation and washed again with 0.15 molar saline solution. The presence of P substance on the surface of these cells is demonstrated by their ability to absorb completely an anti-P human serum, the titer of which is 1:16. Rabbits are injected with one cubic centimeter of a 5% suspension of these tanned and coated red cells, as described in Example I above. The serum from individual rabbits is diluted 1:10 and absorbed with one-half volume of human P-negative red cells. These cells are separated by centrifugation and the supernatant is tested against P-positive and P-negative human red cells as described in Example I above. The presence of anti-P is indicated by positive reactions with P-positive red cells and negative reactions with P-negative red cells. Any serum that fails to react with P-positive red cells is discarded. The sera that pass this test may be pooled and used as a reagent to detect the P factor.

EXAMPLE IV

Six rabbits are inoculated with 2.0 milliliters of a 5% suspension of washed rabbit cells tanned and coated with Le$^a$ containing saliva from an individual of type Le(a+b−). A volume of 15.0 milliliters of 5% tanned rabbit red cells plus 3.0 milliliters of the boiled saliva were incubated at room temperature for 10 minutes. The cells were then washed thoroughly 6 times to remove free Le$^a$ substance. Inoculations were made subcutaneously at four sites twice weekly. After the first series of 5 inoculations, test bleedings showed that three of the six rabbits produced saline agglutinins of anti-Le$^a$ specificity. After a second series of six injections, all six rabbits produced anti-Le$^a$ as shown in Table II. All sera were diluted 1:2 with saline and absorbed with ½ volume of washed, packed cells of type O, Le(a−b−)

P+. The absorptions were carried out at room temperature for one hour.

Table II

| Rabbit Sera Diluted 1:2 | Test Cells—Saline Suspensions | | | | | | | |
|---|---|---|---|---|---|---|---|---|
| | Le(a+) | | | | Le(a−) | | | |
| | 1 | 2 | 3 | 4 | 5 | 6 | 7 | 8 |
| Rabbit 1 | ++ | ++ | ++ | + | 0 | 0 | 0 | 0 |
| Rabbit 2 | +++ | +++ | +++ | +++ | 0 | 0 | 0 | 0 |
| Rabbit 3 | ++ | + | + | + | 0 | 0 | 0 | 0 |
| Rabbit 4 | +++ | ++ | ++ | ++ | 0 | 0 | 0 | 0 |
| Rabbit 5 | ± | ± | ± | ± | 0 | 0 | 0 | 0 |
| Rabbit 6 | +++ | +++ | +++ | ++ | 0 | 0 | 0 | 0 |

The above readings are made after one hour incubation at room temperature and light centrifugation. All pre-inoculation specimens are negative for anti-Le$^a$.

EXAMPLE V

Three and two-tenths milliliters of a solution of ovarian cyst Lewis substance containing 50 micrograms of Lewis substance per milliliter is used to coat about 20 milliliters of a 25% suspension of tanned rabbit cells. Each of six rabbits is injected subcutaneously in multiple sites with 2 milliliters of the tanned and coated red cells. After a course of 8 injections given twice weekly, the rabbit sera after absorption with Le(a−b−) cells showed weak anti-Le$^a$ acting on saline suspended red cells. Another series of six injections were given and tests of the sera at this time showed no activity with saline suspended red cells, but definite anti-Le$^a$ activity after absorbing and testing with appropriate papainized cells at 5° C. The rabbits were given a third series of five injections using twice the amount of the purified Lewis substance for coating the tanned rabbit cells. Table III shows the results obtained after the third series of injections and indicates that all of the sera reacted specifically, two of them quite strongly.

Table III

| Rabbit Sera Diluted 1:4 | Le(a+b−) | | Le(a−b+) | |
|---|---|---|---|---|
| | 1 | 2 | 1 | 2 |
| Rabbit 1 | ++++ | ++++ | 0 | 0 |
| Rabbit 2 | ++ | ++ | 0 | 0 |
| Rabbit 3 | +++ | +++ | 0 | 0 |
| Rabbit 4 | ++++ | ++++ | 0 | 0 |
| Rabbit 5 | + | + | 0 | 0 |
| Rabbit 6 | +++ | +++ | 0 | 0 |

The sera were first absorbed at 1:4 with ½ volume Le(a−b−) cells at room temperature for one hour and reabsorbed with ½ volume of papainized Le(a−b−) cells at 5° C. for another hour. Tests are carried out with papainized cells at 5° C. for one hour and centrifuged lightly.

While the invention has been described with particular reference to specific embodiments, it is to be understood that it is not to be limited thereto but is to be construed broadly and restricted solely by the scope of the appended claims.

What is claimed is:

1. A method of producing blood serum selected from the group consisting of anti-P serum and anti-Le$^a$ serum which comprises tanning red blood cells that are impotent to stimulate the production of the desired anti-serum, coating the tanned cells with the corresponding agglutinogen selected from the group consisting of P-substance and Le$^a$-substance; injecting the tanned and coated red cells into a warm-blooded animal; bleeding the animal after hemagglutinins have been produced and separating the desired anti-serum from the blood so obtained.

2. A method of preparing anti-P serum which comprises tanning red blood cells selected from the group consisting of human P-negative red cells and rabbit red cells; coating the tanned cells and hydatid cyst fluid; injecting the tanned and coated red cells into a rabbit; bleeding the rabbit after anti-P antibodies have been produced and separating the anti-P serum from the blood so obtained.

3. A method of producing anti-P serum which comprises tanning rabbit red blood cells; coating the tanned cells with human hydatid cyst fluid; injecting the tanned and coated red cells into a rabbit; bleeding the rabbit after anti-P antibodies have been produced and separating the anti-P serum from the blood so obtained.

4. A method of producing anti-Le$^a$ serum which comprises tanning rabbit red blood cells; coating the tanned cells with Le$^a$ substance from human saliva; injecting the tanned and coated red cells into a rabbit; bleeding the rabbit after anti-Le$^a$ antibodies have been produced and separating the anti-Le$^a$ serum from the blood so obtained.

5. A method of producing anti-P serum which comprises tanning human P-negative red blood cells; coating the tanned cells with sheep hydatid cyst fluid; injecting the tanned and coated red cells into a rabbit; bleeding the rabbit after anti-P antibodies have been produced and separating the anti-P serum from the blood so obtained.

6. A method of producing anti-Le$^a$ serum which comprises tanning rabbit cells; coating the tanned cells with ovarian cyst Lewis substance; injecting the tanned and coated red cells into a rabbit; bleeding the rabbit after Lewis substance antibodies have been produced and separating the anti-Le$^a$ serum from the blood so obtained.

7. A method of producing anti-P serum which comprises tanning human P-negative red blood cells; coating the tanned cells with human hydatid cyst fluid; injecting the tanned and coated red cells into a rabbit; bleeding the rabbit after anti-P antibodies have been produced and separating the anti-P serum from the blood so obtained.

References Cited in the file of this patent

UNITED STATES PATENTS 2,454,752   Coca _____ Nov. 23, 1948

OTHER REFERENCES

Annison; Biochem. J., vol. 50, Feb. 1952, pp. 460–470.
J.A.M.A., 123:4, Sept. 25, 1943, pp. 212–213.
Nature, 179:4551, Jan. 19, 1957, pp. 147–148.
Boyden: J. Exptl. Med., vol. 93, 1951, pp. 107–120.
Matson: Amer. J. Human Genetics, 11(1), March 1959, pp. 26–34.